United States Patent
Moriya et al.

(10) Patent No.: US 10,487,455 B2
(45) Date of Patent: Nov. 26, 2019

(54) INK APPLICATION METHOD AND METHOD FOR PRODUCING WALLPAPER

(71) Applicants: Yoshihiro Moriya, Shizuoka (JP); Akihiko Gotoh, Kanagawa (JP)

(72) Inventors: Yoshihiro Moriya, Shizuoka (JP); Akihiko Gotoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/772,924

(22) PCT Filed: Oct. 3, 2016

(86) PCT No.: PCT/JP2016/004457
§ 371 (c)(1),
(2) Date: May 2, 2018

(87) PCT Pub. No.: WO2017/090222
PCT Pub. Date: Jun. 1, 2017

(65) Prior Publication Data
US 2018/0320320 A1    Nov. 8, 2018

(30) Foreign Application Priority Data

Nov. 27, 2015   (JP) ................................. 2015-231996
Jun. 29, 2016   (JP) ................................. 2016-128347

(51) Int. Cl.
*B41M 3/18*    (2006.01)
*B41J 2/01*    (2006.01)
(Continued)

(52) U.S. Cl.
CPC ............... *D21H 27/20* (2013.01); *B41J 2/01* (2013.01); *B41M 3/18* (2013.01); *C09D 11/033* (2013.01);
(Continued)

(58) Field of Classification Search
CPC ........ B41J 2/1433; B41J 2/161; B41J 2/1623; B41J 2202/00; B41J 2202/03;
(Continued)

(56) References Cited

U.S. PATENT DOCUMENTS

2013/0201264 A1    8/2013   Terakado et al.
2013/0303640 A1    11/2013  Kim et al.
(Continued)

FOREIGN PATENT DOCUMENTS

EP    2 666 819 A2    11/2013
JP    03-169644       7/1991
(Continued)

OTHER PUBLICATIONS

International Search Report dated Nov. 15, 2016 for counterpart International Patent Application No. PCT/JP2016/004457 filed Oct. 3, 2016.
(Continued)

*Primary Examiner* — Manish S Shah
(74) *Attorney, Agent, or Firm* — Oblon, McClelland, Maier & Neustadt, L.L.P.

(57) ABSTRACT

An ink application method is provided. In the method, an ink is discharged to an object by an inkjet method, to apply the ink to the object. The object includes a base material and a gel layer overlying the base material, and the gel layer includes a vinyl chloride resin and a plasticizer. The ink is an oil-based ink. When a free induction decay curve of the object obtained by a pulse NMR method is separated into two curves respectively derived from a hard component and a soft component, the curve derived from the hard component accounts for 35% to 40% of the free induction decay curve, and the curve derived from the soft component has a spin-spin relaxation time of from 30.0 to 45.0 ms when obtained by a Hahn echo method.

14 Claims, 3 Drawing Sheets

(51) Int. Cl.
*B41M 5/52* (2006.01)
*D21H 27/20* (2006.01)
*C09D 11/322* (2014.01)
*C09D 11/36* (2014.01)
*C09D 11/033* (2014.01)
*C09D 11/037* (2014.01)

(52) U.S. Cl.
CPC .......... *C09D 11/037* (2013.01); *C09D 11/322* (2013.01); *C09D 11/36* (2013.01); *B41M 5/5227* (2013.01); *B41M 5/5254* (2013.01)

(58) Field of Classification Search
CPC .... B41J 2/14201; B41J 2/045; B41J 2/04588; B41J 2/04595; B41J 2/04586; B41J 2/14274; B41J 11/0015; B41J 11/002; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 5/008; C09D 129/04; C09D 125/14; C09D 11/107; C09D 11/106; C08K 3/04
See application file for complete search history.

(56) References Cited

U.S. PATENT DOCUMENTS

| | | | | |
|---|---|---|---|---|
| 2014/0010975 | A1* | 1/2014 | Zhou | B41M 5/504 428/32.18 |
| 2014/0050904 | A1* | 2/2014 | Lee | B32B 5/18 428/201 |
| 2014/0072782 | A1* | 3/2014 | Chung | B32B 27/08 428/195.1 |

FOREIGN PATENT DOCUMENTS

| | | | |
|---|---|---|---|
| JP | 10-264501 | 10/1998 | |
| JP | 2000-226799 A | 8/2000 | |
| JP | 2000-318038 | 11/2000 | |
| JP | 2006-218862 | 8/2006 | |
| JP | 2006-305759 | 11/2006 | |
| JP | 2010-234677 | 10/2010 | |
| JP | 4897848 | 1/2012 | |
| WO | WO 2005/073463 A1 | 8/2005 | |
| WO | WO-2005073463 A1 * | 8/2005 | ............ D21H 27/20 |
| WO | WO 2017/017224 A1 | 2/2017 | |

OTHER PUBLICATIONS

Written Opinion dated Nov. 15, 2016 for counterpart International Patent Application No. PCT/JP2016/004457 filed Oct. 3, 2016.
Extended European Search Report dated Nov. 9, 2018 in European Patent Application No. 16868173.2, citing documents AO through AR therein, 8 pages.

* cited by examiner

[Fig. 1]
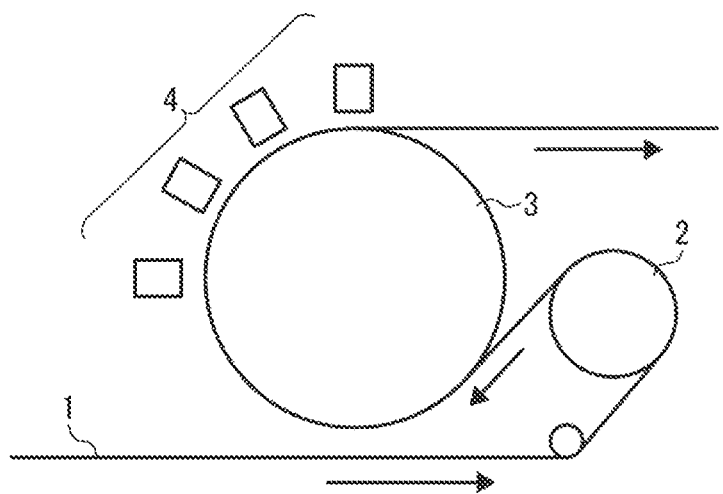
[Fig. 2]
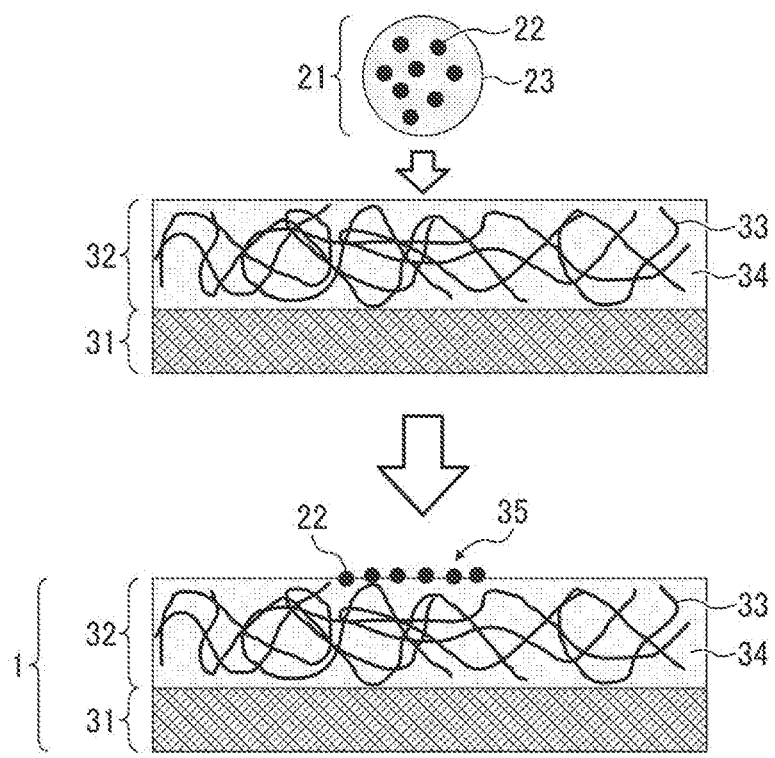

[Fig. 3]
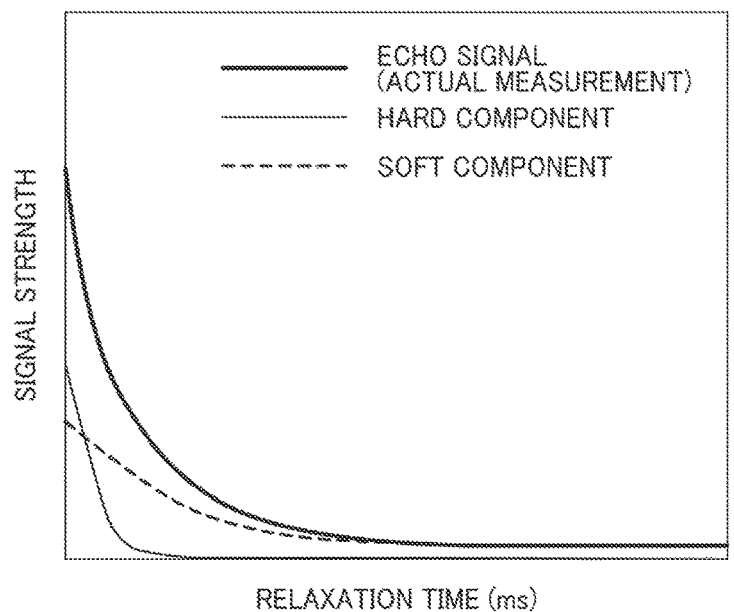
[Fig. 4A]
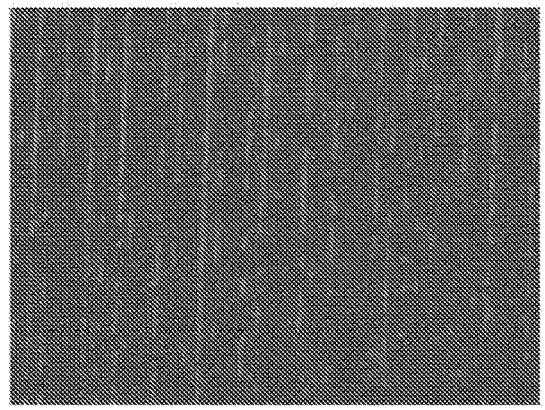
[Fig. 4B]
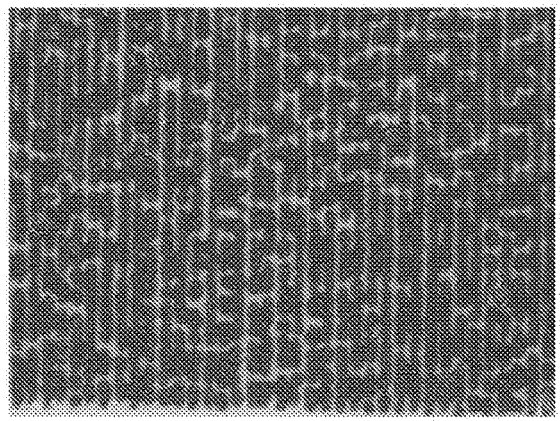

[Fig. 4C]
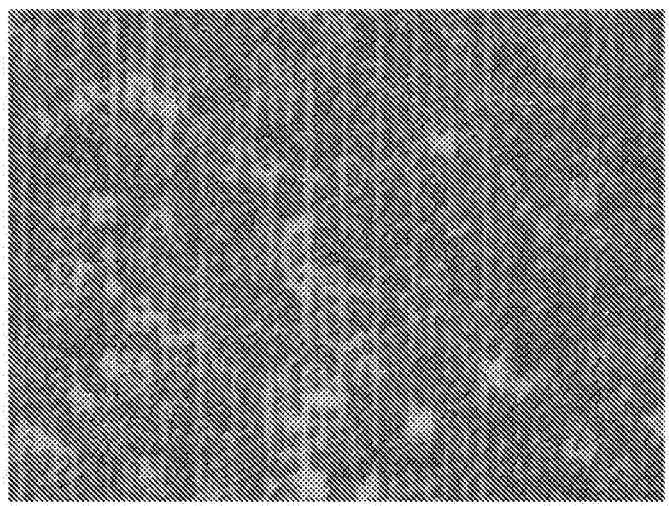
[Fig. 4D]
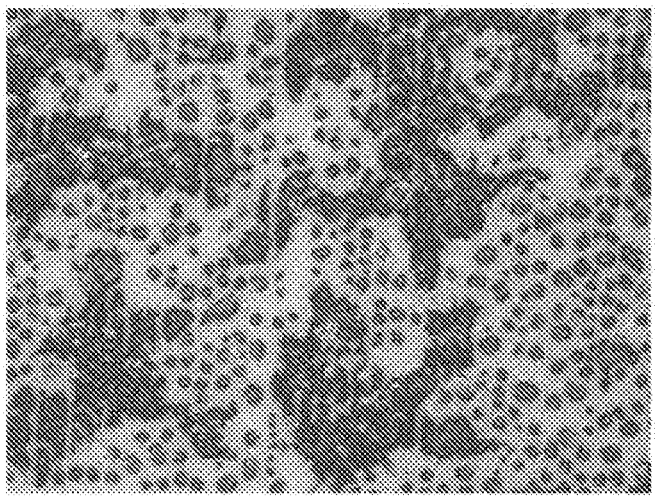

INK APPLICATION METHOD AND METHOD FOR PRODUCING WALLPAPER

TECHNICAL FIELD

The present disclosure relates to an ink application method, particularly a method for applying ink to an object by inkjet printing system, and a method for producing wallpaper.

BACKGROUND ART

For inner walls and ceilings of architectural structures, well-designed wallpapers in the form of sheets are widely used. The wallpaper is generally made of incombustible base paper or non-woven fabric to give sticking property, incombustibility, and fireproof property to the wall surfaces. The wallpaper also has a resin layer on its surface to give resistance to scratch and contamination. The resin layer is composed mainly of a polyvinyl-chloride-based resin containing an ester-oil-based plasticizer. The resin layer further contains a foaming agent that gives flexibility upon foaming. It is widely known that a three-dimensional decoration can be given to the resin layer by embossing.

Recently, many attempts have been made to print a desired image on such a resin layer by inkjet printing system and to apply the resin layer to wallpapers. However, there is a problem that vinyl chloride is very poor at absorbing ink for its material characteristics. To solve this problem, PTL 1 has made an attempt to provide an ink receiving layer on the resin layer composed of vinyl chloride to accelerate permeation and fixation of ink thereto.

A similar attempt has been made in PTL 2 using an oil-based ink. Oil-based ink advantageously provides a high-density image since colorants are dissolved or dispersed therein at a high concentration. Oil-based ink also has excellent resistance to water and nozzle clogging in inkjet apparatuses. Also, having excellent resistance to light and ozone, oil-based inks are widely used for wallpapers applied for large-size POP art, advertisement, and display.

Since the major ingredient is a nonvolatile oily component, oil-based ink has very poor permeability and absorptivity to the resin layer. To solve this problem, PTL 2 has attempted to form an oil-based ink receiving layer composed mainly of a vinyl chloride-acrylic resin copolymer having a desired glass transition temperature on a support, to increase the number of cracks appearing on the surface of the resulting wallpaper and accelerate permeation of ink thereto.

With respect to the method described in PTL 1, provision of the ink receiving layer disadvantageously makes the production process of wallpaper more complicated and the production cost thereof much higher.

The method described in PTL 2 is the same as that described in PTL 1 in that the ink receiving layer is provided to improve ink fixability. However, these methods do not improve inkjet printing quality on wallpapers which are composed of soft vinyl chloride that is generally and widely used.

In view of this situation, there is a demand for an improved inkjet printing method which can print high-quality images on soft vinyl chloride with an ink having high permeability, to produce wallpapers in a simple process.

CITATION LIST

Patent Literature

PTL 1: Japanese Unexamined Patent Application Publication No. 2000-318038
PTL 2: Japanese Patent No. 4897848

SUMMARY OF INVENTION

Technical Problem

One object of the present invention is to provide an ink application method employing inkjet printing system which can print high-quality images on vinyl chloride with high ink absorptivity without any special base treatment.

Solution to Problem

In accordance with some embodiments of the present invention, an ink application method which can provide high-quality images on an object with high ink absorptivity is provided. In the method, an ink is discharged to an object by an inkjet method, to apply the ink to the object. The object includes a base material and a gel layer overlying the base material, and the gel layer includes a vinyl chloride resin and a plasticizer. The ink is an oil-based ink. When a free induction decay curve of the object obtained by a pulse NMR method is separated into two curves respectively derived from a hard component and a soft component, the curve derived from the hard component accounts for 35% to 40% of the free induction decay curve, and the curve derived from the soft component has a spin-spin relaxation time of from 30.0 to 45.0 ms when obtained by a Hahn echo method.

A more complete appreciation of the disclosure and many of the attendant advantages thereof will be readily obtained as the same becomes better understood by reference to the following detailed description when considered in connection with the accompanying drawings.

BRIEF DESCRIPTION OF DRAWINGS

FIG. 1 is a schematic view of an ink application apparatus employing an inkjet printing system in accordance with an embodiment of the present invention.

FIG. 2 is a schematic illustration of a situation where an oil-based ink impacts on an object and a colorant in the oil-based ink fixes on the object.

FIG. 3 is a graph showing a decay curve (echo signal) and two relaxation curves corresponding to hard and soft components, obtained by decomposing the decay curve.

FIG. 4A is a photograph representing the grade A, based on an evaluation criteria of coverage in solid image.

FIG. 4B is a photograph representing the grade B, based on an evaluation criteria of coverage in solid image.

FIG. 4C is a photograph representing the grade C, based on an evaluation criteria of coverage in solid image.

FIG. 4D is a photograph representing the grade D, based on an evaluation criteria of coverage in solid image.

The accompanying drawings are intended to depict example embodiments of the present invention and should not be interpreted to limit the scope thereof. The accompanying drawings are not to be considered as drawn to scale unless explicitly noted.

DESCRIPTION OF EMBODIMENTS

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

Object

The object includes a base material that may be a flat material composed of paper or non-woven fabric, or a stereoscopic material. On at least one surface of the flat material or a surface of the stereoscopic material, a gel layer including a vinyl chloride resin and a plasticizer is provided. The gel layer may further include a heat foaming agent. When the object is wallpaper, the heat foaming agent is preferably used. Hereinafter, descriptions may be made taking an illustrative example in which the object is wallpaper. However, the object is not limited to wallpaper and can be an architectural material including flooring.

When the object is wallpaper, the base material is not limited to a specific material so long as it exhibits proper mechanical strength and heat resistance when used as the wallpaper. For example, paper and non-woven fabric, which are typically used for wallpapers, are preferably used. More specifically, natural paper, plastic film, synthetic paper, non-woven fabric, cloth, wood, and metal thin film can be used for the base material based on the purpose of use.

When water resistance is required, the base material is preferably selected from a plastic film, a synthetic paper sheet made of a synthetic fiber, or a non-woven fabric sheet.

Specific examples of the plastic film include, but are not limited to, a polyester film, a polypropylene film, a polyethylene film, and a laminated body of nylon, vinylon, and/or acrylic films or sheets.

The plastic film is preferably subjected to unaxial or biaxial drawing for improving its strength.

Specific examples of the non-woven fabric sheet includes a sheet formed by spreading polyethylene fibers in a sheet-like pattern and bonding the polyethylene fibers by heat and pressure.

The gel layer, formed on one surface of the base material, includes a vinyl chloride resin and a plasticizer.

The gel layer is formed by coating the vinyl chloride resin on the base material so as to incorporate the plasticizer.

The vinyl chloride resin is a general-purpose resin having excellent physical and chemical properties. Cheaper than other resins, the vinyl chloride resin is widely applied in various fields of soft, semi-hard, and hard resins. Generally, a soft-vinyl-chloride-resin-based product uses a gel layer in which 100 parts by mass of a vinyl chloride resin is swelled and solvated by 30 to 100 parts by mass of a plasticizer.

The gel layer may include a filler, a dispersant, a defoamer, an antiblocking agent, a thickener, and/or a foaming agent, if needed.

The foaming agent may be an inorganic foaming agent, an organic foaming agent, a microcapsule foaming agent, or a combination thereof. Specific examples of the organic foaming agent include, but are not limited to, azodicarbonamide (ADCA), azobisisobutyronitrile (AIBN), p,p'-oxybisbenzenesulfonohydrazide (OBSH), and dinitrosopentamethylenetetramine (DPT).

Specific examples of the inorganic foaming agent include, but are not limited to, inorganic carbonates such as sodium hydrogen carbonate.

Specific examples of the filler include, but are not limited to, aluminum hydroxide, magnesium hydroxide, barium hydroxide, calcium carbonate, magnesium carbonate, calcium sulfate, barium sulfate, ferrous hydroxide, basic zinc carbonate, basic lead carbonate, silica sand, clay, talc, silica, titanium dioxide, and magnesium silicate. Among these materials, calcium carbonate, magnesium carbonate, aluminum hydroxide, and magnesium hydroxide are preferred.

The gel layer includes a plasticizer. Specific examples of the plasticizer include, but are not limited to, phthalate-based plasticizers such as dinonyl phthalate (DNP), dioctyl phthalate (DOP), didecyl phthalate (DDP), diisodecyl phthalate (DIDP), diisononyl phthalate (DINP), ditridecyl phthalate (DTDP), and n-hexyl-n-decyl phthalate (NHDP); phosphate-based plasticizers such as tri-2-ethylhexyl phosphate (TOP); adipate-based plasticizers such as didecyl adipate (DDA) and diisodecyl adipate (DIDA); trimellitate-based plasticizers such as trioctyl trimellitate (TOTM), and tri-n-octyl-n-decyl trimellitate (nonyl DTM); polyester-based plasticizers; epoxy-based plasticizers; sebacate-based plasticizers; azelate-based plasticizers; citrate-based plasticizers; glycolate-based plasticizers; ricinoleate-based plasticizers; maleate-based plasticizers; fumarate-based plasticizers; pyromellitate-based plasticizers; and itaconate-based plasticizers.

The plasticizer is incorporated in and introduced to the gel layer at the time of gelation as the plasticizer is allowed to exist together with the vinyl chloride resin at the time when the vinyl chloride resin is coated on the base material. An object having a high affinity for an oil-based ink is obtained in the above-described manner.

Oil-Based Ink

The ink application method according to an embodiment of the present invention uses an oil-based ink.

The oil-based ink includes an oily component and a colorant. The oil-based ink may further include a binder resin, if needed.

Preferably, the oily component is composed primarily of an ester oil.

The ester oil preferably accounts for 30% by mass or more, more preferably from 50% to 90% by mass, of the oil-based ink, for the purpose of keeping ink fixation strength of the printed image good. In addition, the oil-based ink may include 5% by mass or less of water.

Such an oil-based ink composed primarily of an ester oil can be reliably applied to the gel layer containing the plasticizer by heat, without provision of any special inkjet ink receiving layer, thus providing high-quality image.

Specific examples of the ester oil include, but are not limited to, phthalic acid esters such as dibutyl phthalate, dicapryl phthalate, diisodecyl phthalate, dioctyl phthalate (DOP), diisononyl phthalate, butyl-2-ethylhexyl phthalate, and di-2-ethylhexyl phthalate; adipic acid esters such as dioctyl adipate (diethylhexyl adipate: DOA) and diisononyl adipate (DINA); sebacic acid esters such as dibutyl sebacate, dioctyl sebacate, and diisononyl sebacate; azelaic acid esters such as dibutyl azelate, dioctyl azelate, and diisononyl azelate; lauric acid esters such as methyl laurate, ethyl laurate, and isobutyl laurate; myristic acid esters such as isopropyl myristate, isocetyl myristate, and octyldodecyl myristate; palmitic acid esters such as isopropyl palmitate and octyl palmitate; octanoic acid esters such as cetyl octanoate, octyl octanoate (ethylhexyl ethylhexanoate: OOE), and isononyl octanoate; and isononanoic acid esters such as ethylhexyl isononanoate and isononyl isononanoate.

Among these materials, adipic acid esters, such as dioctyl adipate and diisononyl adipate, and octanoic acid esters, such as octyl octanoate, are preferably used for inkjet imaging systems.

Specific examples of the colorant included in the oil-based ink include, but are not limited to, carbon black; pigments such as azo pigments, phthalocyanine pigments, nitroso pigments, nitro pigments, vat-dye pigments, mordant-dye pigments, basic-dye pigments, acid-dye pigments, and natural-dye pigments; and oil-soluble dyes such as diazo dyes and anthraquinone dyes. Each of these dyes and pigments can be used alone or in combination with others.

Preferably, the oil-based ink is a pigment-based ink. Pigment-based inks are advantageous in that the pigment is unlikely to permeate the object, the ink is unlikely to be damaged by heat in the heating process at foaming, and the resulting image density is unlikely to decrease.

Preferably, the oil-based ink has a heating loss of less than 20% by mass on heating at 150° C. for 1 hour. When the heating loss is less than 20% by mass, the ink will not undergo physical property change with volatilization of volatile components, thus reliably providing high quality image in inkjet printing.

The ink application method according to an embodiment of the present invention is described below taking an illustrative example for producing a wallpaper.

The wallpaper includes an object and an ink layer. The object includes a base material and a gel layer overlying the base material. The gel layer includes a vinyl chloride resin and a plasticizer. The ink layer is formed on the gel layer of the object.

A method for producing wallpaper may include a process of allowing a foaming agent included in the gel layer to foam. Alternatively, the method may not include such a process of allowing a foaming agent, in the case in which no foaming agent is included in the gel layer.

Hereinafter, a method for producing wallpaper in the case in which a foaming agent is included in the gel layer is described.

The method for producing wallpaper includes: an ink application process in which an ink is discharged by an inkjet method to the gel layer to form an image thereon; a foaming process in which the wallpaper is allowed to foam; and an embossing process in which a concave-convex pattern is formed on the surface of the wallpaper.

The method may further include an object producing process in which the gel layer is formed on the base material to produce the wallpaper, prior to the ink application process.

Each of these processes may be performed independently, or the series of processes may be performed successively.

Object Producing Process

The object is produced by forming the gel layer on the base material.

The gel layer materials, including the vinyl chloride resin, the plasticizer, and the foaming agent, are coated on the base material by a known application method such as knife coating method, nozzle coating method, die coating method, lip coating method, comma coating method, gravure coating method, rotary screen coating method, and reverse roll coating method.

After the gel layer materials are applied to the base material, the vinyl chloride resin is heated to gelate. Thus, the gel layer containing the plasticizer is formed.

The gelation temperature is preferably in the range of from 150° C. to 190° C. When the gelation temperature is higher than 190° C., as the gelation progresses, it is likely that multiple grooves are formed on the surface of the gel layer and ink absorptivity of the gel layer deteriorates, thereby significantly degrading inkjet printing quality. When the gelation temperature is lower than 150° C., the gelation progresses insufficiently. As a result, the printed image easily blurs or it becomes difficult to obtain a desired image density.

Ink Application Process

FIG. 1 is a schematic view of an ink application apparatus employing an inkjet printing system in accordance with an embodiment of the present invention. An object 1, composed of the base material and the gel layer thereon, is obtained by the above-described object producing process. The object 1 is preheated by a preheat drum 2 and then conveyed to an inkjet discharger 4 while being heated by a heat drum 3 to keep a constant temperature. Upon impact of ink droplets discharged from the inkjet discharger 4 on the object 1, a desired image is formed on the object 1.

The inventors of the present invention have found that, when a free induction decay curve of the object obtained by a pulse NMR method is separated into two curves respectively derived from a hard component and a soft component, and the curve derived from the hard component accounts for 35% to 40% of the free induction decay curve and the curve derived from the soft component has a spin-spin relaxation time of from 35 to 45 ms when obtained by a Hahn echo method, the object provides both wettability/spreadability and absorptivity to ink droplets, thus providing an image with high image density and less ink blurring.

The object should be compatible with the oil-based ink to rapidly absorb the ink. In this regard, the flow condition (molecular mobility) of the plasticizer in the gel layer of the object should be taken into consideration. When the spin-spin relaxation time obtained by a Hahn echo method with respect to the curve derived from the soft component of the object by a pulse NMR method is greater than 45 ms, the oil-based ink may deteriorate in wettability/spreadability, thereby degrading image density and/or coverage in solid image.

The reason is that, as the molecular mobility of the plasticizer in the gel layer improves, the ink is prevented from wetting/spreading in the lateral direction, while absorption of the impacted ink to the gel layer is accelerated. When the spin-spin relaxation time is less than 30 ms, absorptivity of the impacted ink to the object significantly deteriorates, thereby causing color bleeding between two colors. In extreme cases, adjacent ink droplets may gather and repel each other, thereby significantly degrading image density. This is because the molecular flow of the plasticizer is insufficient and the impacted ink remains on the surface of the object for a long period of time.

FIG. 2 is a schematic illustration of a situation where an oil-based ink 21 impacts on the object 1 and a colorant 22 in the oil-based ink fixes on the object 1. Specifically, the oil-based ink 21 including the colorant 22 and an oily component 23 (e.g., ester oil) impacts on a gel layer 32 formed on a base material 31 of the object 1, and the colorant 22 forms an image 35 on the surface of the gel layer 32.

In accordance with some embodiments of the present invention, the object having a spin-spin relaxation time in the above-described range makes the ink impacted thereon exhibit good absorptivity and wettability/spreadability to the object. Thus, an image having excellent image density and coverage in solid image without color bleeding between two colors is provided.

When the spin-spin relaxation time obtained by a Hahn echo method with respect to the curve derived from the soft component of the object by a pulse NMR method is adjustable by controlling the gel condition of the plasticizer. Specifically, the spin-spin relaxation time is adjustable by varying the heating temperature and heating time at the time of forming the gel layer on the base material, or the temperature of the object at the time when the oil-based ink is brought into contact with the object in an inkjet printing process.

Pulse NMR Method

The measurement based on the pulse NMR method may be performed in accordance with the following procedure.

A high-frequency magnetic field, as a pulse, is applied to the object put in an NMR tube, using a pulse NMR (the minispec mq series available from Bruker Corporation), and the time until x and y components disappear upon tilting of the magnetization vector, i.e., relaxation time, is measured to evaluate mobility of molecules composing the object.

(1) Sample

The object in an amount of 0.2 g is weighed in an NMR tube having a diameter of 10 mm and preheated by a preheater for 15 minutes at a predetermined temperature equivalent to the heating temperature at the time of printing. If the sample is once overheated and then cooled to have the predetermined temperature, the gel condition and properties of the sample significantly differ from the case in which the sample is just heated to have the predetermined temperature. Therefore, heating of the sample should be started after the preheater is adjust to have the predetermined temperature.

(2) Measurement Conditions

Hahn echo method

First 90° Pulse Separation: 0.01 msec

Final Pulse Separation: 20 msec

Number of Data Point for Fitting: 40 points

Cumulated Number: 32 times

Temperature: Equivalent to the heating temperature at the time of printing.

(3) Calculation of Spin-Spin Relaxation Time (t2)

The spin-spin relaxation time (t2) is calculated from a decay curve obtained by the Hahn echo method in the pulse NMR measurement, using an exponential approximation of ORIGIN 8.5 (available from OriginLab Corporation). It is known that the spin-spin relaxation time gets shorter as the molecule mobility gets lower and that the spin-spin relaxation time gets longer as the molecule mobility gets higher.

(4) Calculation of Spin-Spin Relaxation Time (tH, tS)

A decay curve obtained by the Hahn echo method in the pulse NMR measurement is a superimposition of two relaxation curves each derived from a hard component having a low molecule mobility and a soft component having a high molecule mobility.

The obtained echo signal can be separated into two relaxation curves derived from the hard and soft components by using a bi-exponential approximation of ORIGIN 8.5 (available from OriginLab Corporation), and the spin-spin relaxation time (tH, tS) of the respective hard and soft components can be calculated.

FIG. 3 is a graph showing a decay curve and two relaxation curves corresponding to hard and soft components, obtained by decomposing the decay curve.

The hard component having a low molecule mobility is generally derived from a material having a high hardness, and the soft component having a high molecule mobility is generally derived from a material having a high softness.

It is known that the spin-spin relaxation time gets shorter as the molecule mobility gets lower and that the spin-spin relaxation time gets longer as the molecule mobility gets higher.

Accordingly, one of the two relaxation curves which has a shorter spin-spin relaxation time corresponds to the hard component and the other one which has a longer spin-spin relaxation time corresponds to the soft component.

In accordance with some embodiments of the present invention, when producing a wallpaper, after the desired image has been formed on the object by an inkjet printer, a foaming process in which the object having the image thereon is allowed to foam and an embossing process in which the object having the image thereon is given a convex-concave pattern may be performed.

Foaming Process

In the foaming process, a heat foaming agent dispersed in the gel layer of the object is allowed to foam by heating the object.

Embossing Process

In the embossing process, a concave-convex pattern is formed on the foamed gel layer of the object.

The concave-convex pattern can be formed by means of embossing, chemical embossing, rotary screen processing, or build-up printing, which are known methods generally used for giving a concave-convex pattern to wallpapers or decorative materials. These methods, i.e., embossing, chemical embossing, rotary screen processing, and build-up printing are preferably used.

The embossing process may be performed with a cooling embossing roller after heating the object, or with a heating embossing roller by heating the object at once. When the object is wallpaper, the embossing depth is preferably in the rage of 0.08 to 0.50 mm. When the embossing depth is less than 0.08 mm, stereoscopic effect is poor. When the embossing depth is in excess of 0.50 mm, abrasion resistance of the surface may deteriorate.

Other Processes

Other processes which are generally employed in a typical method for producing wallpaper can be performed, if needed. As an example, a coating processing for giving scratch resistance may be performed.

In particular, the object is prevented from being sticky and improved in terms of design when a transparent protective layer is formed by such a coating processing. The protective layer may be preferably composed of an urethane resin, an acrylic resin (e.g., polymethyl methacrylate), or a fluorine resin (e.g., polyvinyl fluoride, polyvinylidene fluoride, polyethylene fluoride).

These processes may be performed either before or after the production process of the wallpaper.

EXAMPLES

Having generally described this invention, further understanding can be obtained by reference to certain specific examples which are provided herein for the purpose of illustration only and are not intended to be limiting.

Object Production Examples

Preparation of Objects 1 to 4

A plasticizer and a stabilizer in predetermined amounts described in Table 1 were mixed and stirred to prepare a mixture liquid. The mixture liquid was further mixed and stirred with an emulsion-polymerized polyvinyl chloride (PSL available from Kaneka Corporation), a foaming agent, calcium carbonate, and titanium dioxide in predetermined amounts described in Table 1.

The resulting mixture was applied to the surface of a paper sheet having a mass of 80 g/m$^2$ by a coater at an amount of application of 130 g/m$^2$. The paper sheet having the applied mixture thereon was put in an oven at a predetermined heating temperature for a predetermined heating time each described in Table 1, to put polyvinyl chloride sol into a pre-gel state. Thus, objects 1 to 4 were prepared.

In Table 1, the numerals represent mass ratio in parts.

TABLE 1

|  |  | Object 1 | Object 2 | Object 3 | Object 4 |
|---|---|---|---|---|---|
|  | Polyvinyl Chloride | 100 | 100 | 100 | 100 |
| Plasticizer | Dioctyl Phthalate (DOP) | 50 | — | 50 | 50 |
|  | Diisononyl Phthalate (DINP) | — | 50 | — | — |
| Filler | Calcium Carbonate | 90 | 90 | 30 | 90 |
|  | Titanium Dioxide | 15 | 15 | 15 | 15 |
| Foaming Agent | Azodicarbonamide | 5 | 5 | 5 | 5 |
| Stabilizer | Ba/Zn Stabilizer for Polyvinyl Chloride | 3 | 3 | 3 | 3 |
| Heating Conditions | Heating Temperature | 120° C. | 120° C. | 120° C. | 180° C. |
|  | Heating Time | 90 sec | 90 sec | 90 sec | 40 sec |

Pulse NMR Measurement

The objects 1 to 4 were subjected to a pulse NMR measurement as follows. Each of the objects 1 to 4 was subjected to a measurement of the spin-spin relaxation time obtained by the Hahn echo method with respect to the curve derived from the soft component of the object using a pulse NMR (the minispec mq series available from Bruker Corporation) under the above-described detailed conditions.

The spin-spin relaxation times thus measured varying the heating time are described in Table 2.

TABLE 2

| | Spin-spin Relaxation Time for Soft Component (ms) | | | |
|---|---|---|---|---|
| | 100° C. | 110° C. | 120° C. | 130° C. |
| Object 1 | 29.8 | 32.2 | 37.9 | 42.3 |
| Object 2 | 21.2 | 23.8 | 29.6 | 35.8 |
| Object 3 | 38.5 | 42.1 | 45.5 | 51.8 |
| Object 4 | 20.8 | 22.5 | 28.6 | 33.4 |

Ink Production Examples

Preparation of Inks 1 to 4

Inks 1 to 3 were prepared by mixing components listed in Table 3 and subjecting the mixture to a dispersion treatment with a bead mill disperser. Ink 4 was prepared by stirring components listed in Table 3 for 1 hour while heating them to 30° C.

In Table 3, the numerals represent mass ratio in parts.

TABLE 3

|  |  | Ink 1 | Ink 2 | Ink 3 | Ink 4 |
|---|---|---|---|---|---|
| Oily Components | Octyl Octanoate (OOE) | 85 | — | — | — |
|  | Diisononyl Adipate (DINA) | — | 85 | — | — |
|  | Dioctyl Adipate (DOA) | — | — | 85 | 94.5 |
| Colorants | Pigment: Carbon Black (Regal 400) | 10 | 10 | 10 | — |
|  | Dye: Oil Black 860 | — | — | — | 0.5 |
| Dispersant | Solsperse 13940 | 5 | 5 | 5 | 5 |

Example 1

The object 1 was secured on a hot plate with a heat-resistant double-sided adhesive tape, and the surface was heated to 110° C. An inkjet printer IPSIO GX5500 (available from Ricoh Co., Ltd.) was modified in such a manner that the hot plate was s introduced into the ink printing part. After being filled with the ink 1, this modified imaging apparatus was allowed to print a 600-dpi solid image.

The resulting image was subjected to evaluations of (1) coverage in solid image, (2) ink absorptivity, and (3) image density, in the following manner.

The resulting image was further subjected to a foaming processing by being heated at 210° C. for 30 seconds, and then an embossing process using an embossing roller. The embossed image was further subjected to an evaluation of (4) image density difference after embossing.

The evaluation results are shown in Table 4.

(1) Coverage in Solid Image

The resulting image was magnified with a microscope (VHX available from Keyence Corporation) at a magnification of 450 times, and a solid part of the image was photographed. The photograph was subjected to a binarization process using a free software program Image J to determine the area ratio of the ink to the background of the object. This area ratio was defined as "coverage". The coverage was evaluated based on the following criteria. Photographs representing the grades A to D are shown in FIGS. 4A to 4D, respectively.

Evaluation Criteria

A: The coverage was not less than 80%.
B: The coverage was not less than 70% and less than 80%.
C: The coverage was not less than 60% and less than 70%.
D: The coverage was less than 60%.

(2) Ink Absorptivity

The resulting image was rubbed 10 times with a piece of paper (Lumi Art Gloss 130 gsm) cut into a square with each side having a length of 1.2 mm. The rubbed image was observed with both a microscope and the naked eye to determine the degree of image blurring.

Evaluation Criteria

A: No image blurring was observed. Good.
B: Image blurring was slightly observed with the microscope, but was less visible with the naked eye. Acceptable.
C: Image blurring was observed with the naked eye.
D: Ink in a liquid state was spread over the rubbed portion. Cannot put into practical use.

(3) Image Density

A solid part of the resulting image was subjected to a measurement of image density using a reflective color spectrophotometric densitometer (available from X-Rite).

Evaluation Criteria

A: Image density was not less than 1.2.
B: Image density was not less than 1.0 and less than 1.2.

C: Image density was not less than 0.8 and less than 1.0.
D: Image density was less than 0.8.

(4) Image Density Difference After Embossing

The resulting image was subjected to a measurement of image density using a reflective color spectrophotometric densitometer (available from X-Rite) before and after being subjected to the foaming and embossing processes. The difference in image density before and after the foaming and embossing processes was evaluated based on the following criteria.

Evaluation Criteria

B: The difference in image density was less than 0.05.
C: The difference in image density was not less than 0.05 and less than 0.1.
D: The difference in image density was not less than 0.1.

Example 2

The procedure in Example 1 was repeated except for changing the heating temperature from 110° C. to 120° C. to prepare an image of Example 2. The image was subjected to the foaming and embossing processes. The evaluation results are shown in Table 4.

Example 3

The procedure in Example 1 was repeated except for changing the heating temperature from 110° C. to 130° C. to prepare an image of Example 3. The image was subjected to the foaming and embossing processes. The evaluation results are shown in Table 4.

Example 4

The procedure in Example 1 was repeated except for replacing the object 1 with the object 2 and changing the heating temperature from 110° C. to 130° C. to prepare an image of Example 4. The image was subjected to the foaming and embossing processes. The evaluation results are shown in Table 4.

Example 5

The procedure in Example 4 was repeated except for replacing the ink 1 with the ink 2 to prepare an image of Example 5. The image was subjected to the foaming and embossing processes. The evaluation results are shown in Table 4.

Example 6

The procedure in Example 4 was repeated except for replacing the ink 1 with the ink 3 to prepare an image of Example 6. The image was subjected to the foaming and embossing processes. The evaluation results are shown in Table 4.

Example 7

The procedure in Example 1 was repeated except for replacing the object 1 with the object 3 and changing the heating temperature from 110° C. to 100° C. to prepare an image of Example 7. The image was subjected to the foaming and embossing processes. The evaluation results are shown in Table 4.

Example 8

The procedure in Example 1 was repeated except for replacing the object 1 with the object 3 to prepare an image of Example 8. The image was subjected to the foaming and embossing processes. The evaluation results are shown in Table 4.

Example 9

The procedure in Example 1 was repeated except for replacing the object 1 with the object 4 and changing the heating temperature from 110° C. to 130° C. to prepare an image of Example 9. The image was subjected to the foaming and embossing processes. The evaluation results are shown in Table 4.

Example 10

The procedure in Example 9 was repeated except for replacing the ink 1 with the ink 2 to prepare an image of Example 10. The image was subjected to the foaming and embossing processes. The evaluation results are shown in Table 4.

Example 11

The procedure in Example 9 was repeated except for replacing the ink 1 with the ink 3 to prepare an image of Example 11. The image was subjected to the foaming and embossing processes. The evaluation results are shown in Table 4.

Example 12

The procedure in Example 6 was repeated except for replacing the ink 3 with the ink 4 to prepare an image of Example 12. The image was subjected to the foaming and embossing processes. The evaluation results are shown in Table 4.

Example 13

The procedure in Example 11 was repeated except for replacing the ink 3 with the ink 4 to prepare an image of Example 13. The image was subjected to the foaming and embossing processes. The evaluation results are shown in Table 4.

Comparative Example 1

The procedure in Example 1 is repeated except for changing the heating temperature from 110° C. to 100° C. to prepare an image of Comparative Example 1. The image is subjected to the foaming and embossing processes. The evaluation results are shown in Table 4.

Comparative Example 2

The procedure in Example 1 is repeated except for replacing the object 1 with the object 2 and changing the heating temperature from 110° C. to 120° C. to prepare an image of Comparative Example 2. The image is subjected to the foaming and embossing processes. The evaluation results are shown in Table 4.

Comparative Example 3

The procedure in Comparative Example 2 is repeated except for replacing the ink 1 with the ink 2 to prepare an image of Comparative Example 3. The image is subjected to the foaming and embossing processes. The evaluation results are shown in Table 4.

Comparative Example 4

The procedure in Comparative Example 2 is repeated except for replacing the ink 1 with the ink 3 to prepare an image of Comparative Example 4. The image is subjected to the foaming and embossing processes. The evaluation results are shown in Table 4.

Comparative Example 5

The procedure in Example 1 is repeated except for replacing the object 1 with the object 3 and changing the heating temperature from 110° C. to 120° C. to prepare an image of Comparative Example 5. The image is subjected to the foaming and embossing processes. The evaluation results are shown in Table 4.

Comparative Example 6

The procedure in Example 1 is repeated except for replacing the object 1 with the object 4 and changing the heating temperature from 110° C. to 120° C. to prepare an image of Comparative Example 6. The image is subjected to the foaming and embossing processes. The evaluation results are shown in Table 4.

REFERENCE SIGNS LIST 1 object
2 preheat drum
3 heat drum
4 inkjet discharger
21 oil-based ink
22 colorant
23 oily component
31 base material
32 gel layer
33 gel network
34 oily component including plasticizer
35 image

The invention claimed is:

1. An ink application method, comprising:
   applying a vinyl chloride resin and a plasticizer to a base material and heating the vinyl chloride resin to gelate, wherein a gelation temperature is from 150 to 190° C., to form an object comprising the base material and a gel layer overlying the base material, the gel layer comprising the vinyl chloride resin and a plasticizer;
   heating the object;
   discharging an ink to the heated object by an inkjet method, to apply the ink to the heated object,
   wherein the ink is an oil-based ink,
   wherein, when a free induction decay curve of the object obtained by a pulse NMR method is separated into two curves respectively derived from a hard component and a soft component, the curve derived from the hard component accounts for 35% to 40% of the free induction decay curve, and the curve derived from the soft

TABLE 4

| | Ink | Object | Heating Temp. (° C.) | Relaxation Time (ms) | Coverage in Solid Image | Ink Absorptivity | Image Density | Image Density Difference after Embossing | Overall Evaluation |
|---|---|---|---|---|---|---|---|---|---|
| Example 1 | Ink 1 | Object 1 | 110 | 32.2 | A | B | B | B | B |
| Example 2 | Ink 1 | Object 1 | 120 | 37.9 | B | A | A | B | A |
| Example 3 | Ink 1 | Object 1 | 130 | 42.3 | B | A | B | B | B |
| Example 4 | Ink 1 | Object 2 | 130 | 35.8 | A | B | B | B | B |
| Example 5 | Ink 2 | Object 2 | 130 | 35.8 | A | B | A | B | A |
| Example 6 | Ink 3 | Object 2 | 130 | 35.8 | A | A | A | B | A |
| Example 7 | Ink 1 | Object 3 | 100 | 38.5 | B | A | A | B | A |
| Example 8 | Ink 1 | Object 3 | 110 | 42.1 | B | A | B | B | B |
| Example 9 | Ink 1 | Object 4 | 130 | 33.4 | A | B | B | B | B |
| Example 10 | Ink 2 | Object 4 | 130 | 33.4 | A | B | B | B | B |
| Example 11 | Ink 3 | Object 4 | 130 | 33.4 | A | A | A | B | A |
| Example 12 | Ink 4 | Object 2 | 130 | 35.8 | A | A | C | A | A |
| Example 13 | Ink 4 | Object 4 | 130 | 33.4 | A | A | C | A | A |
| Comparative Example 1 | Ink 1 | Object 1 | 100 | 29.8 | C | D | D | D | D |
| Comparative Example 2 | Ink 1 | Object 2 | 120 | 29.6 | C | D | C | D | D |
| Comparative Example 3 | Ink 2 | Object 2 | 120 | 29.6 | C | D | C | D | D |
| Comparative Example 4 | Ink 3 | Object 2 | 120 | 29.6 | D | D | D | D | D |
| Comparative Example 5 | Ink 1 | Object 3 | 120 | 45.5 | C | A | C | C | C |
| Comparative Example 6 | Ink 1 | Object 4 | 120 | 28.6 | D | D | C | D | D |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

component has a spin-spin relaxation time of from 30.0 to 45.0 ms when obtained by a Hahn echo method.

2. An ink application method, comprising:

forming a gel layer on a base material to form an object, the gel layer comprising a vinyl chloride resin and a plasticizer and being gelated at a temperature of 150 to 190° C.;

heating the object;

discharging an oil-based ink to the heated object by an inkjet method, to apply the oil-based ink to the heated object, wherein, when a free induction decay curve of the object obtained by a pulse NMR method is separated into two curves respectively derived from a hard component and a soft component, the curve derived from the hard component accounts for 35% to 40% of the free induction decay curve, and the curve derived from the soft component has a spin-spin relaxation time of from 30.0 to 45.0 ms when obtained by a Hahn echo method.

3. The method according to claim 1, wherein the oil-based ink is a pigment ink.

4. The method according to claim 1, wherein the object is a wallpaper.

5. The method according to claim 4, wherein the gel layer comprises a foaming agent.

6. A method for producing wallpaper, comprising:

obtaining a wallpaper according the method of claim 4; and embossing the wallpaper to form a concavo-convex pattern thereon.

7. A method for producing wallpaper, comprising:

obtaining a wallpaper according the method of claim 5;

heating the wallpaper to allow the foaming agent in the gel layer to foam; and embossing the wallpaper to form a concavo-convex pattern thereon.

8. The method according to claim 2, wherein the oil-based ink is a pigment ink.

9. The method according to claim 2, wherein the object is a wallpaper.

10. The method according to claim 9, wherein the gel layer comprises a foaming agent.

11. A method for producing wallpaper, comprising:

obtaining a wallpaper according to the method of claim 9; and embossing the wallpaper to form a concavo-convex pattern thereon.

12. A method for producing wallpaper, comprising:

obtaining a wallpaper according to the method of claim 10;

heating the wallpaper to allow the foaming agent in the gel layer to foam; and embossing the wallpaper to form a concavo-convex pattern thereon.

13. The method according to claim 1, wherein the gel layer consists essentially of:

polyvinyl chloride, the plasticizer, and optionally a filler, foaming agent, or stabilizer.

14. The method according to claim 1, wherein the plasticizer is at least one selected from the group consisting of dioctyl phthalate and diisononyl phthalate.

* * * * *